(12) United States Patent
Xia

(10) Patent No.: US 8,332,423 B2
(45) Date of Patent: Dec. 11, 2012

(54) METHOD AND APPARATUS FOR CONTENT SHARING

(75) Inventor: Hui Xia, Nanjing (CN)

(73) Assignee: Huawei Technologies, Co., Ltd., Shenzhen (CN)

( * ) Notice: Subject to any disclaimer, the term of this patent is extended or adjusted under 35 U.S.C. 154(b) by 0 days.

(21) Appl. No.: 13/092,828

(22) Filed: Apr. 22, 2011

(65) Prior Publication Data

US 2011/0196892 A1    Aug. 11, 2011

Related U.S. Application Data

(63) Continuation of application No. PCT/CN2009/074580, filed on Oct. 23, 2009.

(30) Foreign Application Priority Data

Oct. 23, 2008   (CN) .......................... 2008 1 0224689

(51) Int. Cl.
*G06F 17/30* (2006.01)
(52) U.S. Cl. .............. 707/769; 707/828; 726/2; 726/28; 726/30
(58) Field of Classification Search .................. 707/769, 707/821, 999.001, 999.01, 828; 726/2, 28, 726/30
See application file for complete search history.

(56) References Cited

U.S. PATENT DOCUMENTS

| | | | |
|---|---|---|---|
| 6,947,556 B1 * | 9/2005 | Matyas et al. ................. | 380/29 |
| 7,047,406 B2 * | 5/2006 | Schleicher et al. ........... | 713/168 |
| 7,328,225 B1 * | 2/2008 | Beloussov et al. .................. | 1/1 |
| 7,380,273 B2 * | 5/2008 | Coley et al. ..................... | 726/12 |
| 7,506,034 B2 * | 3/2009 | Coates et al. .................. | 709/219 |
| 7,512,607 B2 * | 3/2009 | Nagano et al. .......................... | 1/1 |
| 7,546,299 B2 * | 6/2009 | Benco et al. ........................... | 1/1 |
| 7,600,262 B2 * | 10/2009 | Nomura .......................... | 726/27 |
| 7,640,246 B2 * | 12/2009 | Nam Koong et al. .................. | 1/1 |
| 7,680,882 B2 * | 3/2010 | Tiu et al. ........................ | 709/203 |
| 7,702,730 B2 * | 4/2010 | Spataro et al. ................ | 709/205 |
| 7,853,986 B2 * | 12/2010 | Watanabe .......................... | 726/2 |
| 7,971,223 B2 * | 6/2011 | Kahn et al. ....................... | 725/92 |

(Continued)

FOREIGN PATENT DOCUMENTS

CN    101068245 A    11/2007

(Continued)

OTHER PUBLICATIONS

Written Opinion of the International Searching Authority dated Feb. 4, 2010 in connection with International Patent Application No. PCT/CN2009/074580.

(Continued)

*Primary Examiner* — Phuong Thao Cao

(57) ABSTRACT

The present invention discloses a content sharing method and apparatus and pertains to the Internet field. The content sharing method includes: receiving a shared content access request which carries an identity (ID) of a sendShareUser, an ID of a receiveShareUser, and an contentID of a shared node; authenticating the receiveShareUser according to the ID of the sendShareUser, ID of the receiveShareUser, and contentID of the shared node; and providing the shared content to the receiveShareUser according to the contentID of the shared node after the authentication succeeds. The apparatus includes a receiving module, an authenticating module, and a shared content providing module. The present invention separates the management and maintenance of a node from the sharing relation of the node, so that the maintenance and management of the node do not affect the sharing relation of the node.

16 Claims, 8 Drawing Sheets

U.S. PATENT DOCUMENTS

| | | | |
|---|---|---|---|
| 8,032,562 B2* | 10/2011 | Dunn et al. | 707/803 |
| 2001/0027472 A1* | 10/2001 | Guan | 709/203 |
| 2004/0052378 A1* | 3/2004 | Shiragami et al. | 380/277 |
| 2004/0068524 A1* | 4/2004 | Aboulhosn et al. | 707/200 |
| 2004/0172558 A1* | 9/2004 | Callahan et al. | 713/201 |
| 2004/0199514 A1* | 10/2004 | Rosenblatt et al. | 707/10 |
| 2004/0205090 A1* | 10/2004 | Shimbo et al. | 707/200 |
| 2005/0114333 A1* | 5/2005 | Nagano et al. | 707/8 |
| 2005/0144478 A1* | 6/2005 | Yamanaka et al. | 713/201 |
| 2005/0192966 A1* | 9/2005 | Hilbert et al. | 707/10 |
| 2005/0198317 A1* | 9/2005 | Byers | 709/228 |
| 2005/0289237 A1* | 12/2005 | Matsubara et al. | 709/232 |
| 2006/0069656 A1* | 3/2006 | Horikiri | 705/71 |
| 2007/0078938 A1* | 4/2007 | Hu et al. | 709/206 |
| 2007/0094272 A1* | 4/2007 | Yeh | 707/10 |
| 2007/0101139 A1* | 5/2007 | Bayer et al. | 713/168 |
| 2007/0136384 A1* | 6/2007 | Hepper et al. | 707/200 |
| 2007/0199025 A1* | 8/2007 | Angiolillo et al. | 725/47 |
| 2008/0031601 A1* | 2/2008 | Hashimoto et al. | 386/126 |
| 2008/0040283 A1* | 2/2008 | Morris | 705/59 |
| 2008/0112405 A1* | 5/2008 | Cholas et al. | 370/389 |
| 2008/0140672 A1* | 6/2008 | Tomida et al. | 707/10 |
| 2008/0189293 A1* | 8/2008 | Strandel et al. | 707/10 |
| 2008/0297607 A1* | 12/2008 | Minatogawa | 348/207.1 |
| 2009/0049147 A1* | 2/2009 | Kato et al. | 709/206 |
| 2009/0063850 A1* | 3/2009 | Joram et al. | 713/155 |
| 2009/0113560 A1* | 4/2009 | Kori et al. | 726/29 |
| 2009/0125391 A1* | 5/2009 | Toutonghi | 705/14 |
| 2009/0125522 A1* | 5/2009 | Kodama et al. | 707/9 |
| 2009/0177757 A1* | 7/2009 | Pottenger | 709/219 |
| 2009/0204606 A1* | 8/2009 | Osada | 707/5 |
| 2009/0216859 A1* | 8/2009 | Dolling | 709/218 |
| 2009/0265439 A1* | 10/2009 | Nakashiro et al. | 709/206 |
| 2009/0265443 A1* | 10/2009 | Moribe et al. | 709/217 |
| 2010/0070919 A1* | 3/2010 | Araumi | 715/810 |
| 2010/0082682 A1* | 4/2010 | Kinoshita | 707/784 |
| 2010/0138382 A1* | 6/2010 | Nagoya et al. | 707/609 |
| 2010/0146115 A1* | 6/2010 | Bezos | 709/225 |
| 2010/0153237 A1* | 6/2010 | LaJoie et al. | 705/27 |
| 2010/0299716 A1* | 11/2010 | Rouskov et al. | 726/1 |
| 2011/0072267 A1* | 3/2011 | Johansson | 713/170 |
| 2011/0119290 A1* | 5/2011 | Dhoble | 707/769 |
| 2011/0162056 A1* | 6/2011 | Takahashi et al. | 726/7 |

FOREIGN PATENT DOCUMENTS

| | | | |
|---|---|---|---|
| CN | 101207842 A | | 6/2008 |
| JP | 2005-209181 | * | 8/2005 |
| WO | WO 98/22890 A1 | | 5/1998 |
| WO | WO 2008/004767 A1 | | 1/2008 |

OTHER PUBLICATIONS

Partial Translation of Office Action dated Oct. 8, 2011 in connection with Chinese Patent Application No. 200810224689.0.

International Search Report dated Feb. 4, 2010 in connection with International Patent Application No. PCT/CN2009/074580.

Extended European Search Report of the European Patent Office dated Sep. 5, 2012 in connection with European Patent Application No. 09821600.5, 7 pages.

* cited by examiner

METHOD AND APPARATUS FOR CONTENT SHARING

CROSS-REFERENCE TO RELATED APPLICATIONS

This application is a continuation of International Application No. PCT/CN2009/074580, filed on Oct. 23, 2009, which claims priority to Chinese Patent Application No. 200810224689.0, filed on Oct. 23, 2008, both of which are hereby incorporated by reference in their entireties.

TECHNICAL FIELD

The present invention relates to the Internet field, and in particular, to a method and an apparatus for content sharing.

BACKGROUND

With the development of Internet and storage technologies, it becomes an irresistible trend to provide network storage space to Internet users and provide a new information exchanging method based on the storage space. The local disk space and data volume of a user are also increasing rapidly. Therefore, the sharing of content between users is frequent in either the local area network or the network storage space.

In a prior art, access to a shared file is related to the absolute path of the shared file in its local file system. Currently, the search of files in a file system is based on the absolute path such as /D0/F00 of the files. By using the directory name or the file name as the search object, the search begins from the root directory along the directory tree until the related physical file is located. Under the preceding physical file search mechanism, once the absolute path of a shared file is changed, the access of a shared file receiver to the shared file will fail.

For example, a Windows file system does not allow moving or renaming of a shared directory or its parent directory. The moving or renaming operation will cause the sharing relation of the directory to be cancelled.

In a Linux system, when directories are shared over the Network File System (NFS) protocol, the same problem also exists. For example, the directories of machine B are listed in the Linux system on machine A, and when machine B changes the name of a shared directory or moves the shared directory to another directory, machine A will no longer be able to access the original directory.

During the implementation of the present invention, the inventor finds that the prior art has at least the following weakness:

In the current file system, the maintenance of sharing relations and the organization of file directories are mixed up. When the organization of a file directory or the name of a file or directory is changed, the existing sharing relation is affected. Consequently, management is difficult for the user of the file system.

SUMMARY

In order that the changes of the file directory organization, filename, or directory name do not affect the existing sharing relation, embodiments of the present invention provide a method and an apparatus for content sharing. The technical solution is as follows:

A content sharing method includes:
receiving a shared content access request which carries an identity (ID) of a sendShareUser, an ID of a receiveShareUser, and a contentID of a shared node;
authenticating the receiveShareUser according to the ID of the sendShareUser, ID of the receiveShareUser, and contentID of the shared node; and
providing shared content to the receiveShareUser according to the contentID of the shared node after the authentication succeeds.

A content sharing apparatus includes:
a receiving module (801), configured to receive a shared content access request which carries an ID of a sendShareUser, an ID of a receiveShareUser, and a contentID of a shared node;
an authenticating module (802), configured to authenticate the receiveShareUser when the receiving module receives the shared content access request of the receiveShareUser; and
a shared content providing module (803), configured to provide shared content to the receiveShareUser according to the contentID of the shared node.

The technical solution of the present invention provides the following benefits:

Each node (file or directory) is allocated a contentID which is unique in the local system and through which the physical file entity can be directly located, and the contentID is associated with its organization information so as to organize all nodes into a directory tree; during a content sharing process, a sharing relation table that includes the unique contentID is recorded, so that the locating of the physical file is separated from the organization of the directory and that the organization of the file directory does not affect the locating of the physical file. The management and maintenance of a node are separated from the sharing relation of the node, so that the maintenance and management of the node do not affect the sharing relation of the node. The authentication mechanism in the shared content access process makes the sharing process more reliable and more secure.

DETAILED DESCRIPTION

To make the purpose, technical solution, and benefits of the present invention clearer, the embodiments of the present invention are described in detail with reference to the accompanying drawings.

In an embodiment of the present invention, a unique content ID is allocated to each node in a file system and a directory tree based organization method is used according to the content ID so as to separate the organization of file directory structure in the file system or network hard disk from the sharing of the node content, so that changes in the file directory structure do not impact access to shared node content.

Figure 1:
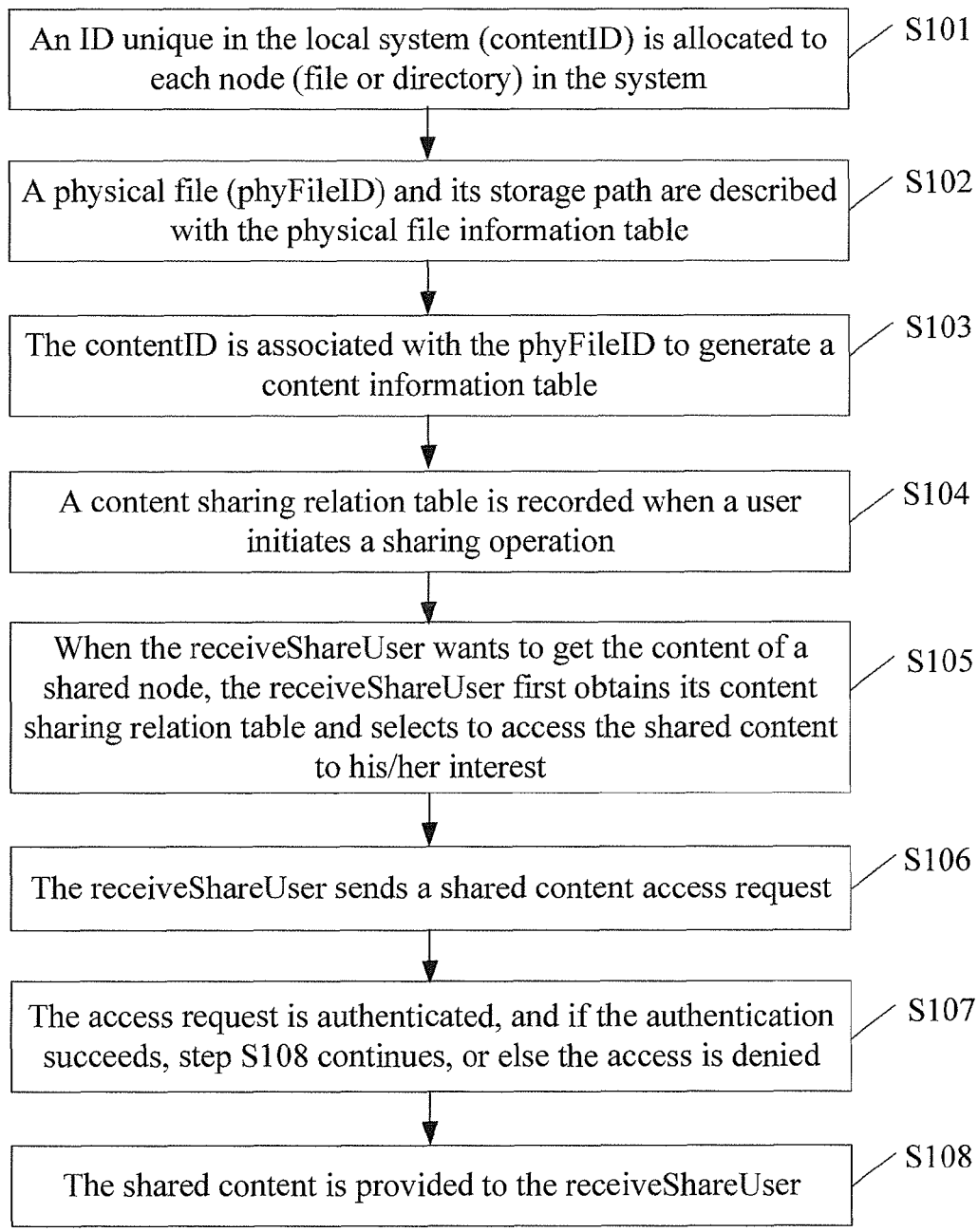
FIG. 1 is a flowchart of a content sharing method according to an embodiment of the present invention.

FIG. 1 illustrates a content sharing method in an embodiment of the present invention. The method includes the following steps:

S101. A contentID unique in the local system is allocated to each node (file or directory) in the system.

S102. Physical files and their storage paths are described by using the physical file information table similar to Table 1.

TABLE 1

| phyFileID | fileStorePath |
| --- | --- |
| Physical file ID | Physical file storage path |

The phyFileID represents the physical file in real existence. One physical file has only one phyFileID. The fileStoreID represents the lower-layer storage path of the physical file in real existence, for example, the sector of a hard disk or the absolute physical storage path in the local file system where the physical file is stored.

S103. The contentID is associated with the phyFileID to generate a content information table similar to Table 2.

TABLE 2

| contentID | Content Name | Content Desc | Content Size | Create Time | modTime | phyFileID | parentContentID |
| --- | --- | --- | --- | --- | --- | --- | --- |
| Content ID | Content name | Content description | Content size | Time of creation | Time of modification | Physical file ID | Parent directory ID |

When the node identified by a contentID is a file, one contentID is mapped to only one phyFileID and one phyFileID can be mapped to multiple contentIDs. This is intended to save resources. When one file is copied repetitively, it is not necessary to generate Table 1 repetitively but only necessary to allocate a different contentID for each copied file. The phyFileID associated with the contentID can be found in Table 2 through the contentID and then the fileStorePath associated with the phyFileID can be found in Table 1 according to the phyFileID so that the physical content entity of the file can be located directly. When thy: node identified by a contentID is a directory, the phyFileID is blank.

The phyFileID and fileStorePath in Table 1, and the ContentName, ContentDesc, ContentSize, CreateTime, modTime, phyFileID, and parentContentID in Table 2 can be referred to as the organization information of the contentID.

The relation between contentID and parentContentID is:

when the contentID identifies a file, the parentContentID is the contentID of the parent directory of the file; and when the contentID identifies a directory, the parentContentID is the contentID of the parent directory of the directory.

The purpose of the relation is to organize the inclusion relation between a directory and a file and the homing relation between a parent directory and its child directory in the form of a directory tree. Such relations are not in one-to-one mapping with the storage relations of physical files. This provides a technical basis for the moving and renaming of files and directories.

When a user moves a file or directory, the parentContentID of the file or directory is changed to the contentID of the new target directory.

When the user renames a file or directory, the contentName of the file or directory is changed to a new name.

Steps S101 to S103 are the basic steps of the content sharing method and need not be repeated for each sharing action. After steps S101 to S103 are executed, the following steps can be performed to achieve the sharing of content.

S104. When the user starts a sharing action, a content sharing relation table similar to Table 3 is recorded.

TABLE 3

| contentID | sendShareUser | receiveShareUser | shareTime | shareRight | shareName |
| --- | --- | --- | --- | --- | --- |
| Content ID | User sending the shared content | User receiving the shared content | Sharing time | Sharing right | Name of the shared content |

The sharing relation of a directory or file (both referred to as a node) is described by using the relation between the contentID and the user instead of the relation between the name of the node or the absolute path of the node in the directory tree and the user. When the sharing of node content is described in such a data structure, the sharing is not affected by the location or name of the node.

The contentID of a node remains the same all the time so that the receiveShareUser can always obtain the content entity of the node according to the obtained contentID. Changes to the original name or path of the shared node do not affect the access of the receiveShareUser to the shared node content.

The sendShareUser, receiveShareUser, shareTime, shareRight, and shareName in Table 3 can be referred to as the sharing information of the contentID.

S105. When the receiveShareUser wants to obtain the content of a shared node, the receiveShareUser obtains its content sharing relation table, selects the shared content interesting to the receiveShareUser, and access such shared content.

S106. The receiveShareUser sends a shared content access request.

If the receiveShareUser requests access a shared file or directory, the shared content access request carries the following parameters: user ID of the sendShareUser and contentID of the requested shared node.

If the receiveShareUser requests access a file under a shared directory, the shared content access request carries the following parameters: user ID of the sendShareUser and the path of the file in the shared directory, such as contentID of the shared directory/contentID of a subdirectory (if any)/content ID of the file.

S107. The shared content access request is authenticated.

When the receiveShareUser requests access a shared file or a shared directory, look up the content sharing relation table according to the user ID of the sendShareUser and the contentID of the requested shared content that are carried in the shared content access request. If the sendShareUser and contentID of one record in the content sharing relation table are the same as the user ID of the sendShareUser and the contentID of the requested shared content carried in the shared content access request and the receiveShareUser of the record matches the user ID of the receiveShareUser, the authentication succeeds and step S108 continues. If no such record exists, the authentication fails and the access to the shared content is rejected.

When the receiveShareUser requests access a file under a shared directory, look up the content: sharing relation table and the content information table according to the user ID of the sendShareUser and the access path of the file in the shared directory that are carried in the shared content access request. If the sendShareUser of one record in the content sharing relation table is the same as the user ID of the sendShareUser, the receiveShareUser of the record matches the user ID of the receiveShareUser, and the related file is found in the content information table through the mapping relation between the contentID and the parentContentID according to the access path of the file in the shared directory in the request, the authentication succeeds and step S108 continues. If no such record exists, the authentication fails and the access to the shared content is rejected.

S108. The shared content is provided to the receive-ShareUser.

Specifically, this step includes:

When the shared node is a file, the ID of the physical entity related to the shared node is obtained according to the contentID of the shared node and then the lower-layer storage path of the physical entity is obtained according to the ID of the physical entity. The physical entity is located according to the lower-layer storage path and the content of the physical entity is provided to the receiveShareUser.

When the shared node is a directory, search for all shared subnodes whose parentContentID is the contentID of the shared node. If the contentID of a shared subnode is the parentContentID of other nodes, search for the other nodes and a list of all content under the shared node is provided to the receiveShareUser.

In the embodiment of the present invention, each node (file or directory) is allocated a contentID which is unique in the local system and through which the physical file entity can be directly located; all nodes are organized into a mapping relation between a contentID and a parentContentID; during a content sharing process, a sharing relation table that includes the unique contentID is recorded, so that the locating of the physical file is separated from the organization of the directory and that the organization of the file directory does not affect the locating of the physical file. The management and maintenance of a node are separated from the sharing relation of its content, so that the maintenance and management of the node do not affect the sharing relation of the node. The authentication mechanism in the shared content access process makes the sharing process more reliable and more secure.

The following further explains the content sharing method provided in the embodiment of the present invention by describing the network hard disk sharing function provided by a network storage system.

Figure 2:
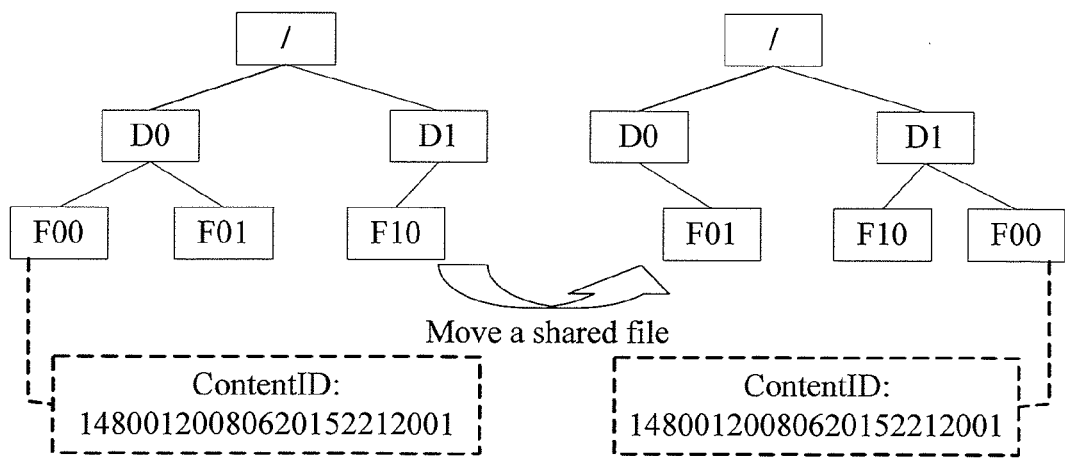
FIG. 2 illustrates the moving of a shared file in an embodiment of the present invention.

As shown in FIG. 2, the preparations include:

S201. A contentID unique in the local system is allocated to all nodes in the network hard disk system:

contentID of the root directory/: 148001200806201522212000;
    contentID of directory D0: 14800120080620152212010;
    contentID of directory D1: 14800120080620152212011;
    contentID of file F00: 14800120080620152212001;
    contentID of file F01: 14800120080620152212002; and
    contentID of file F10: 14800120080620152212003.

S202. Physical files and their storage paths are described by using the physical file information table similar to Table 4.

TABLE 4

| phyFileID | fileStorePath |
|---|---|
| FF00 | Sector A |
| FF01 | Sector B |
| FF10 | Sector C |

S203. The contentID is associated with the phyFileID to generate a content information table similar to Table 5.

TABLE 5

| contentID | Content Name | Content Desc | Content Size | Create Time | Mod Time | Phy FileID | Parent ContentID |
|---|---|---|---|---|---|---|---|
| 14800120080620152212000 | / | Root directory | 3 k | June, 2008 | July, 2008 | | |
| 14800120080620152212010 | D0 | Directory | 2 kb | June, 2008 | July, 2008 | | 14800120080620152212000 |
| 14800120080620152212011 | D1 | Directory | 1 kb | June, 2008 | July, 2008 | | 14800120080620152212000 |
| 14800120080620152212001 | F00 | File | 50 mb | June, 2008 | July, 2008 | FF00 | 14800120080620152212010 |
| 14800120080620152212002 | F01 | File | 20 mb | June, 2008 | July, 2008 | FF01 | 14800120080620152212010 |
| 14800120080620152212003 | F10 | File | 80 mb | June, 2008 | July, 2008 | FF10 | 14800120080620152212011 |

Steps S201 to S203 are basic steps of content sharing and need not be repeated for each sharing action. After steps S201 to S203 are executed, the following steps can be performed to achieve the sharing of content.

Assume the sendShareUser is A, described as client A; the receiveShareUser is B, described as client B.

Figure 3:
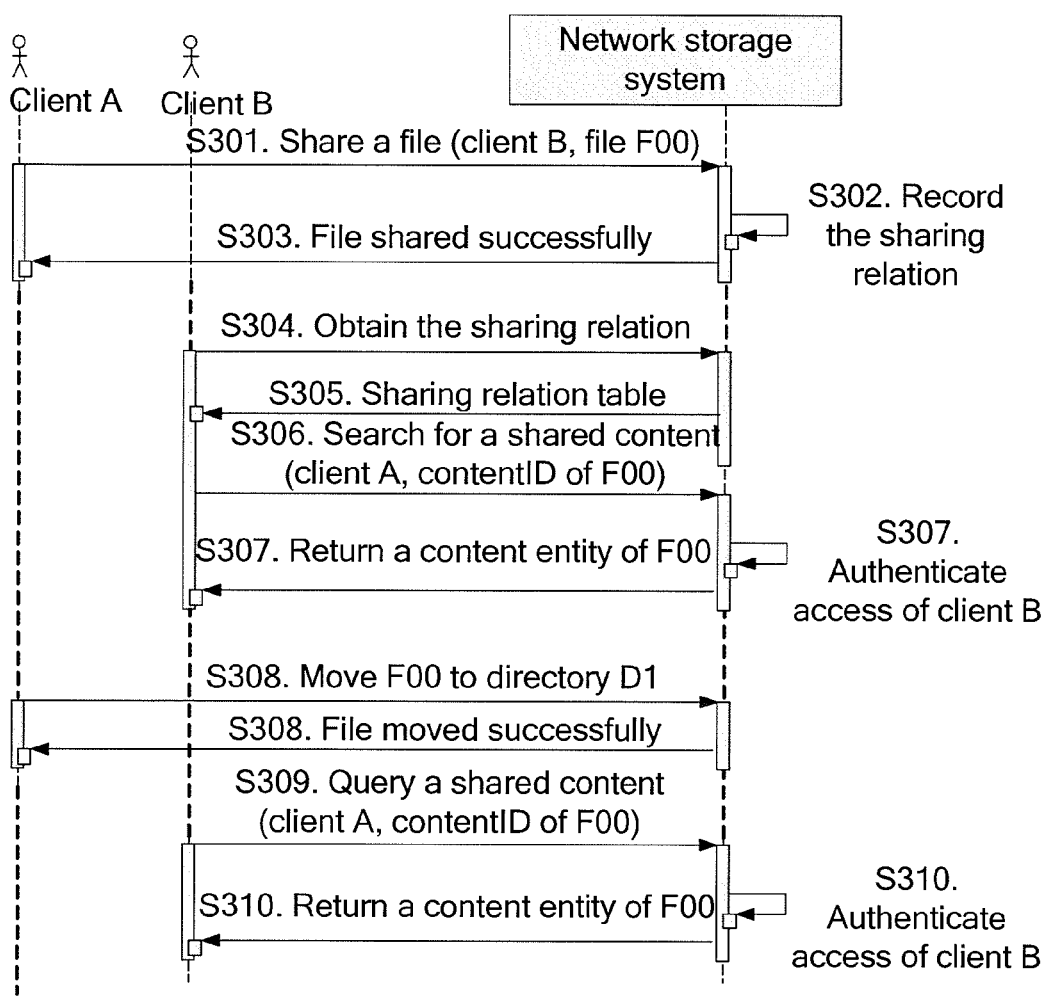
FIG. 3 is a flowchart of access to a shared file in an embodiment of the present invention.

After client A shares the file F00 with client B, if client A moves the file F00 from directory D0 to D1, the access of client B to the file F00 is not affected. As shown in FIG. 3, the specific procedure includes:

S301. Client A initiates a sharing operation to the network storage system to share the file F00 with client B.

S302. The network storage system records the sharing relation shown in Table 6.

TABLE 6

| contentID | Send Share User | receiveShare User | shareTime | Share Right | Share Name |
|---|---|---|---|---|---|
| 148001200806020152212001 | Client A | Client B | 14th, Jul., 2008 | Downloadable | F00 |

S303. The network storage system returns an F00 sharing success message to client A.

S304. Client B sends a sharing relation obtaining request to the network storage system.

S305. After receiving the request of client B, the network storage system sends a sharing relation list of client B to client B.

S306. Client B sends a shared content access request to the network storage system. The request carries the user ID of the sendShareUser (client A) and the contentID (148001200806020152212001) of F00.

S307. The network storage system authenticates the access of client B.

The network storage system looks up the content sharing relation table according to the user ID of the sendShareUser (client A) and the contentID (148001200806020152212001) of the requested shared content that are carried in the access request. If the sendShareUser and contentID of one record (Table 6) in the content sharing relation table are the same as the user ID of the sendShareUser and the contentID of the requested content that are carried in the access request, and the receiveShareUser of the record matches the user ID of the receiveShareUser (client B), the authentication succeeds. The network storage system looks up the content information table (Table 5) according to the contentID of F00 and obtains the phyFileID related to F00, FF00, and then looks up the physical file information table (Table 4) according to FF00 to obtain the lower-layer storage path of F00. The network storage system finds the physical entity of F00 according to the record in the physical file information table (Table 4) and returns all content under file F00 to client B. If no such record exists, the authentication fails and the access to the shared content is rejected.

S308. Client A moves the file F00 from the original directory D0 to the directory D1, and the network storage system changes the parentContentID of F00 in the physical information table (Table 4) to the contentID of D1 (148001200806020152212011) without changing other parameters in the physical file information table (Table 4), and sends a file move success message to client A.

S309. Client B sends a shared content access request to the network storage system. The request carries the user ID of the sendShareUser (client A) and the contentID (148001200806020152212001) of F00.

S310. The network storage system authenticates the access of client B. For details, see step S307.

Although the parentContentID of F00 is changed, the contentID of F00 is not changed. After the network storage system authenticates the access request according to the user ID of the sendShareUser (client A) and the contentID of the requested shared content (F00) that are carried in the access request, the authentication still succeeds. The network storage system finds the physical storage location of F00 according to the phyFileID related to the contentID of F00 and provides the content of F00 to client B.

Figure 4:
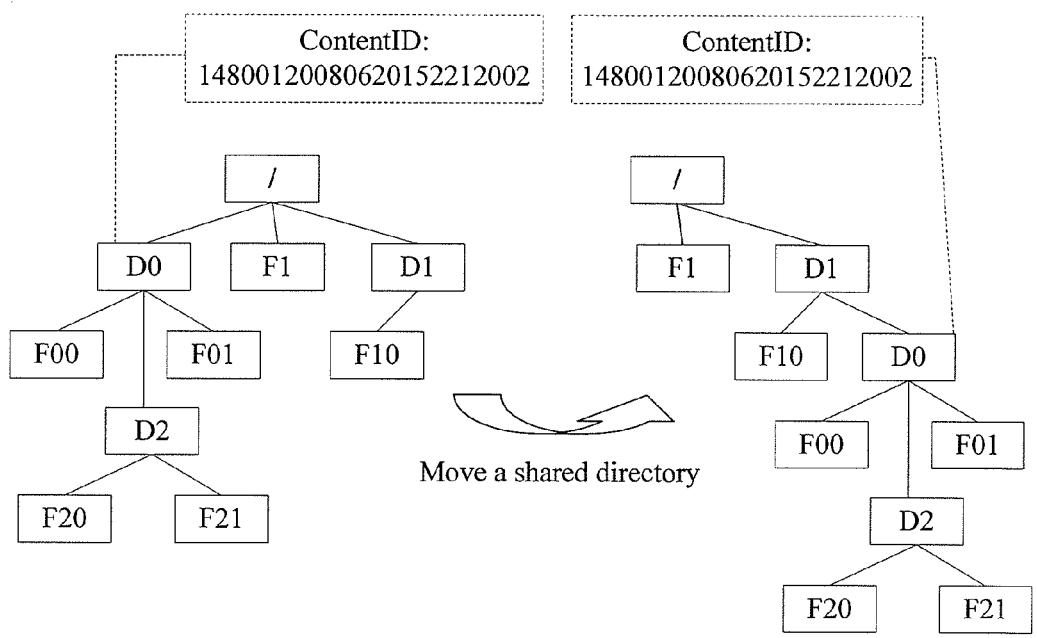
FIG. 4 illustrates the moving of a shared directory in an embodiment of the present invention.
Figure 5:
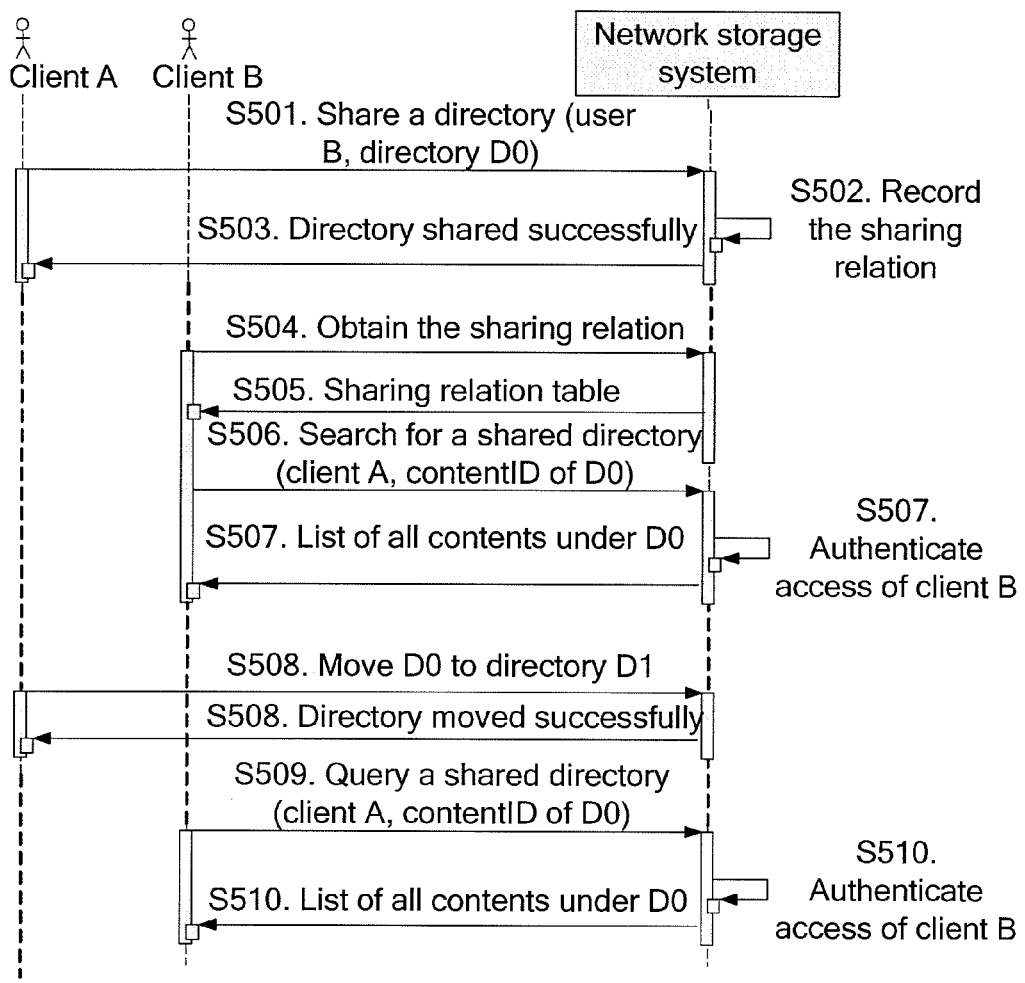
FIG. 5 is a flowchart of access to a shared directory in an embodiment of the present invention.

As shown in FIG. 4, client A shares directory D0 (the contentID is 148001200806020152212002) with client B, and when client A moves D0 from the root directory of a network hard disk to directory D1, the access of client B to D0 is not affected either. The specific procedure is shown in FIG. 5.

S501. Client A initiates a sharing operation to the network storage system to share the directory D0 with client B.

S502. The network storage system automatically records the sharing relation shown in Table 7.

TABLE 7

| contentID | Send ShareUser | Receive ShareUser | shareTime | Share Right | Share Name |
|---|---|---|---|---|---|
| 148001200806 20152212002 | Client A | Client B | 14th, Jul., 2008 | Browse | D0 |

S503. The network storage system returns a D0 sharing success message to client A.

S504. Client B sends a sharing relation obtaining request to the network storage system.

S505. After receiving the request of client B, the network storage system sends the sharing relation list of client B to client B.

S506. Client B sends a shared content access request to the network storage system. The request carries the user ID of the sendShareUser (client A) and the contentID of D0 (148001200806020152212002).

S507. The network storage system authenticates the access of client B.

The network storage system looks up the content sharing relation table according to the user ID of the sendShareUser and the contentID of the requested shared content (148001200806020152212002). If the sendShareUser and contentID of one record in the content sharing relation table (Table 7) are the same as the user ID of the sendShareUser and the contentID of the requested shared content that are carried in the access request, and the receiveShareUser of the record matches the user ID of the receiveShareUser (client B), the authentication succeeds. The network storage system searches for a node whose parentContentID is the contentID of D0. If the contentID of the found node is still the parent-ContentID of other nodes, the network storage system continues to search for other nodes and send a list of all content under the shared directory D0 to client B. If no such record exists, the authentication fails and the access to the shared content is rejected.

S508. Client A moves D0 from the root directory of the network hard disk to D1, and the network storage system changes the parentContentID of D0 to the contentID of D1 (14800120080620152212011) without changing other parameters and sends the directory move success message to client A.

S509. Client B sends a shared directory access request to the network storage system. The request carries the user ID of the sendShareUser (client A) and the contentID of D0 (14800120080620152212002).

S510. The network storage system authenticates the access of client B. For details, see step S507.

Although the parentContentID of D0 is changed, the contentID of D0 is not changed. After the network storage system authenticates the access request according to the user ID of the sendShareUser (client A) and the contentID of the requested shared content D0 carried in the access request, the authentication still succeeds. The network storage system finds the physical storage location of D0 according to the contentID of D0 and provides all content under D0 to client B.

When client A renames the directory D0, step S508 may be replaced by the following step:

S508'. Client A renames the directory D0, and the network storage system changes the contentName of D0 to the new name of D0 without changing other parameters and sends a file move success message to client A.

Figure 6:
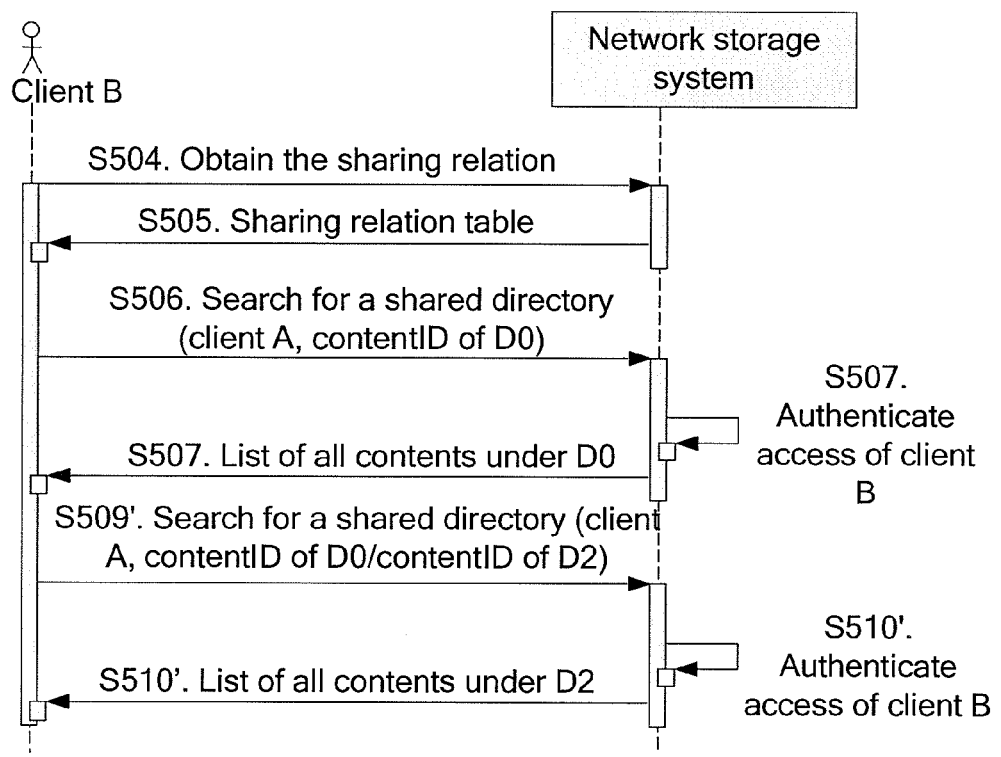
FIG. 6 is a flowchart of access to a subdirectory of a shared directory in an embodiment of the present invention.

When client A moves the directory D0 to the directory D1, and client B wants to access the subdirectory D2 under the shared directory D0, as shown in FIG. 6, steps S509 and S510 can be replaced by the following steps:

S509'. Client B sends a shared directory access request to the network storage system. The request carries the user ID of the sendShareUser (client A) and the access path of the subdirectory D2 (contentID of D0/contentID of D2).

S510'. The network storage system authenticates the access of client B (for details, see step S507) and if the authentication succeeds, sends a list of all content under D2 to client B. If the authentication fails, the access to the shared content is rejected.

Figure 7:
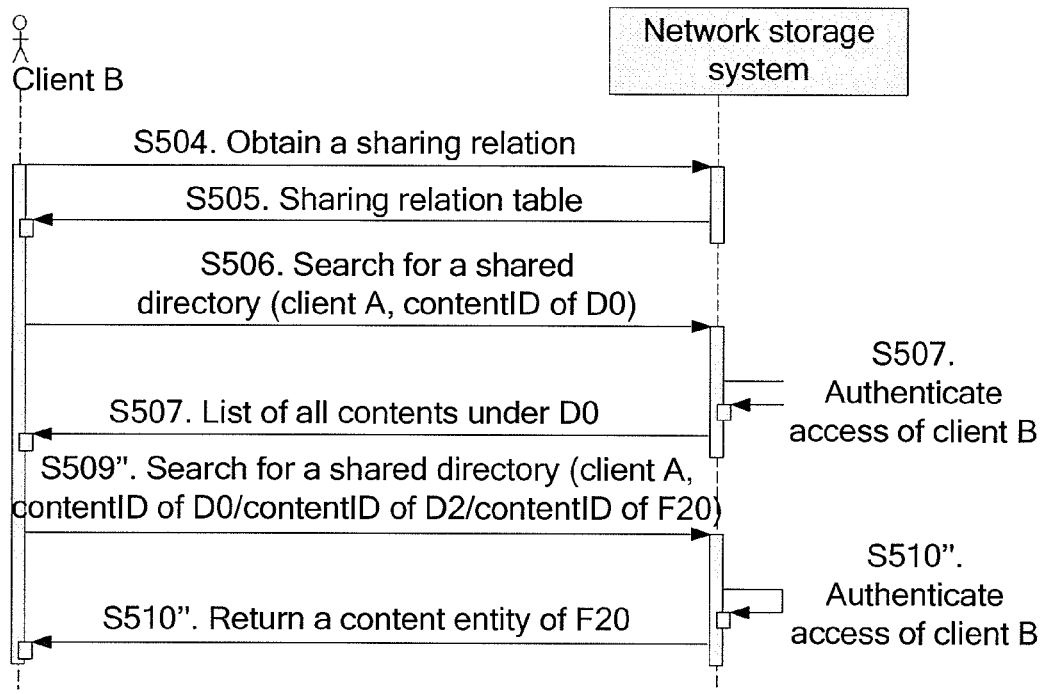
FIG. 7 is a flowchart of access to a file under a shared directory in an embodiment of the present invention.

When client A moves the directory D0 to the directory D1, and client B wants to access the file F20 under the subdirectory D2 in the shared directory D0, as shown in FIG. 7, steps S509 and S510 can be replaced by the following steps:

S509". Client B sends a request to access a file under the subdirectory in the shared directory. The request carries the user ID of the sendShareUser (client A) and the access path of the file F20 (that is, contentID of D0/contentID of D2/contentID of F20).

S510". The network storage system authenticates the access of client B (for details, see step S507), and if the authentication succeeds, sends the content: entity of F20 to client B. If the authentication fails, the access to the shared content is rejected.

By describing the access of a user to a moved shared file, a moved shared directory, a subdirectory of a moved shared directory, and a file under a moved shared directory, and the access to a renamed shared content, the embodiment: of the present invention explains that the sharing relation of a file or directory is not affected by the moving or renaming of the file or directory in a file system or network hard disk. The receiveShareUser can still access the shared file or directory and the access right control information is not changed.

Figure 8:
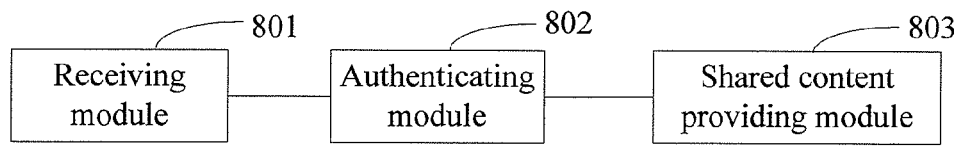
FIG. 8 illustrates a structure of a content sharing apparatus according to an embodiment of the present invention.

FIG. 8 illustrates a content sharing apparatus in an embodiment of the present invention. The apparatus includes:

a receiving module 801, configured to receive a shared content access request which carries the ID of the sendShareUser, ID of the receiveShareUser, and contentID of the shared node;

an authenticating module 802, configured to authenticate the receiveShareUser according to the ID of the sendShareUser, ID of the receiveShareUser, and contentID of the shared node; and a shared content providing module 803, configured to provide the shared content to the receiveShareUser according to the contentID of the shared node if the authentication succeeds.

Figure 9:
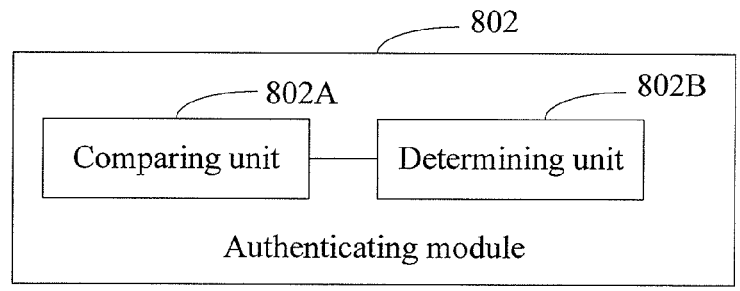
FIG. 9 illustrates a structure of an authenticating module according to an embodiment of the present invention.

A structure of the authenticating module 802 is illustrated in FIG. 9, including a comparing unit 802A and a determining unit 802B.

The comparing unit 802A is configured to compare the ID of the sendShareUser carried in the shared content access request with the ID of the sendShareUser in the sharing information, compare the ID of the receiveShareUser carried in the shared content access request with the ID of the receiveShareUser in the sharing information, and compare the contentID of the shared node carried in the shared content access request with the contentID of the shared node in the sharing information, and send a comparison result to the determining unit 802B.

The determining unit 802B is configured to determine whether all compared items of the comparing unit 802A are matched, and if all compared items are matched, determine that the authentication succeeds, and if not all compared items are matched, determine that the authentication fails and obtain the authentication result.

Figure 10:
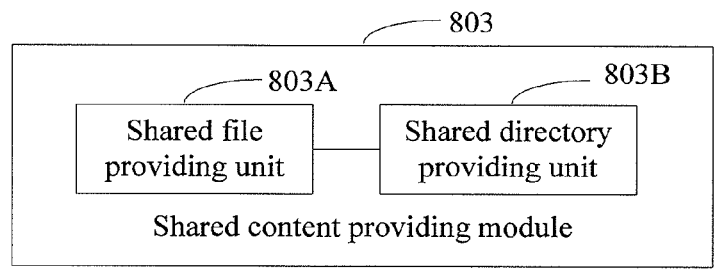
FIG. 10 illustrates a structure of a shared content providing module according to an embodiment of the present invention.

A structure of the shared content providing module 803 is illustrated in FIG. 10, including a shared file providing unit 803A and a shared directory providing unit 803B.

The shared file providing unit 803A is configured to obtain the ID of the physical entity related to the shared node when the shared node is a file according to the contentID of the shared node, obtain the lower-layer storage path of the physical entity according to the ID of the physical entity, locate the physical entity according to the lower-layer storage path, and provide the content of the physical entity to the receiveShareUser.

The shared directory providing unit 803B is configured to search for all shared subnodes whose parentContentID is the contentID of the shared node when the shared node is a directory, and if the contentID of a shared subnode is the parentContentID of other nodes, search for the other nodes, and provide a list of all content under the shared node to the receiveShareUser.

Figure 11:
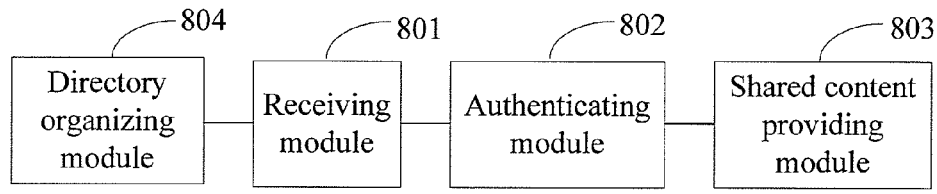
FIG. 11 illustrates another structure of the content sharing apparatus according to an embodiment of the present invention.

As shown in FIG. 11, the apparatus further includes a directory organizing module 804.

Figure 12:
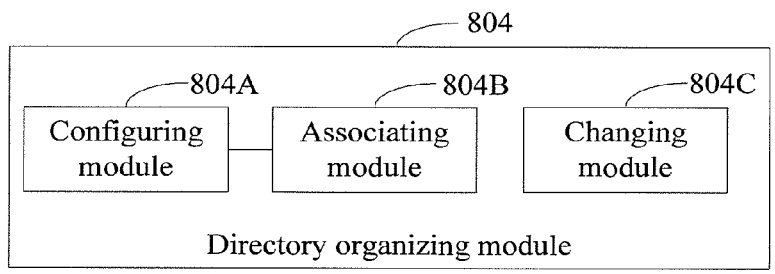
FIG. 12 illustrates a structure of a directory organizing module according to an embodiment of the present invention.

A structure of the directory organizing module 804 is illustrated in FIG. 12, including:

a configuring unit 804A, configured to allocate a contentID unique in the local system for each node in the system; and an associating unit 804B, configured to associate the contentID of a node with the organization information of the node, where the organization information includes the parentContentID of the node and the contentName of the node. If the node is a file, the organization information also includes the ID of the physical entity related to the node, where the ID of the physical entity corresponds to the lower-layer storage path of the physical entity.

The directory organizing module 804 further includes:
a changing unit 804C, configured to change the parentContentID associated with the node to the contentID of the moved parent directory; and when the node is renamed, change the contentName associated with the node to the renamed contentName.

Figure 13:
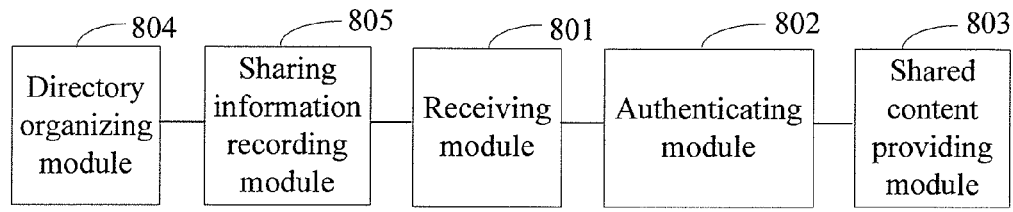
FIG. 13 illustrates another structure of the content sharing apparatus according to an embodiment of the present invention.

As shown in FIG. 13, the apparatus further includes:
a sharing information recording module 805, configured to record sharing information when the sendShareUser initiates a node sharing operation, where the sharing information includes the contentID of the shared node, ID of the sendShareUser, and ID of the receiveShareUser.

The content sharing apparatus provided in the embodiment of the present invention separates the locating of a physical file from the organization of a directory, so that the organization of a file directory does not affect the locating of the physical file. Because the sharing information recording module records the sharing list that includes the unique contentID in the content sharing process, the access to the shared content is not affected by the organization of the directory. The authenticating module makes the sharing process more secure.

The embodiment of the present invention can be implemented through software. The software program can be stored in a readable storage medium, such as a hard disk, a cache, or a compact disk-read only memory (CD-ROM) in a computer.

Although the present invention has been described in detail through some preferred embodiments, the invention is not limited to such embodiments. It is apparent that those skilled in the art can make various modifications and variations to the invention without departing from the spirit and scope of the present invention. The invention is intended to cover the modifications and variations provided that they fall within the scope of protection defined by the claims or their equivalents.

What is claimed is:

1. A content sharing method, executed by a content sharing apparatus having a processor, the method comprising:
    allocating a contentID unique in a local system for each node in the local system;
    associating the contentID with organization information of the node, wherein the organization information comprises a parentContentID of the node and a contentName of the node;
    receiving a shared content access request which carries an identity (ID) of a sendShareUser, an ID of a receiveShareUser, and a contentID of a shared node;
    authenticating the receiveShareUser according to the ID of the sendShareUser, the ID of the receiveShareUser, and the contentID of the shared node; and
    providing shared content to the receiveShareUser according to the contentID of the shared node after the authentication succeeds.

2. The method of claim 1, wherein, when the node is a file, the organization information further comprises an ID of a physical entity corresponding to the node, wherein the ID of the physical entity corresponds to a lower-layer storage path of the physical entity.

3. The method of claim 1, further comprising:
    changing the parentContentID associated with the node to the contentID of a moved parent directory when the node is moved; and
    changing the contentName of the node to a renamed contentName when the node is renamed.

4. The method of claim 1, further comprising:
    recording sharing information when a sharing operation is initiated, wherein the sharing information comprises the contentID of the shared node, the ID of the sendShareUser, and the ID of the receiveShareUser.

5. The method of claim 4, wherein the authentication comprises:
    comparing the ID of the sendShareUser, the ID of the receiveShareUser, and the contentID of the shared node carried in the shared content access request respectively with the ID of the sendShareUser, the ID of the receiveShareUser, and the contentID of the shared node in the sharing information, and determining whether the compared items are matched; and if all items are matched, determining that the authentication succeeds; if not all items are matched, determining that the authentication fails.

6. The method of claim 1, wherein the providing the shared content to the receiveShareUser according to the contentID of the shared node after the authentication succeeds comprises:
    obtaining the ID of the physical entity related to the shared node according to the contentID of the shared node when the shared node is a file, obtaining the lower-layer storage path of the physical entity according to the ID of the physical entity, locating the physical entity according to the lower-layer storage path, and providing the content of the physical entity to the receiveShareUser; and
    searching for all shared subnodes whose parentContentID is the contentID of the shared node when the shared node is a directory, and if the contentID of a shared subnode is the parentContentID of other nodes, searching for the other nodes, and providing a list of all content under the shared node to the receiveShareUser.

7. The method of claim 2, wherein the providing the shared content to the receiveShareUser according to the contentID of the shared node after the authentication succeeds comprises:
    obtaining the ID of the physical entity related to the shared node according to the contentID of the shared node when the shared node is a file, obtaining the lower-layer storage path of the physical entity according to the ID of the physical entity, locating the physical entity according to the lower-layer storage path, and providing the content of the physical entity to the receiveShareUser; and
    searching for all shared subnodes whose parentContentID is the contentID of the shared node when the, shared node is a directory, and if the contentID of a shared subnode is the parentContentID of other nodes, searching for the other nodes, and providing a list of all content under the shared node to the receiveShareUser.

8. The method of claim 3, wherein the providing the shared content to the receiveShareUser according to the contentID of the shared node after the authentication succeeds comprises:
    obtaining the ID of the physical entity related to the shared node according to the contentID of the shared node when the shared node is a file, obtaining the lower-layer storage path of the physical entity according to the ID of the physical entity, locating the physical entity according to the lower-layer storage path, and providing the content of the physical entity to the receiveShareUser; and
    searching for all shared subnodes whose parentContentID is the contentID of the shared node when the shared node is a directory, and if the contentID of a shared subnode is the parentContentID of other nodes, searching for the other nodes, and providing a list of all content under the shared node to the receiveShareUser.

9. The method of claim 4, wherein the providing the shared content to the receiveShareUser according to the contentID of the shared node after the authentication succeeds comprises:
   obtaining the ID of the physical entity related to the shared node according to the contentID of the shared node when the shared node is a file, obtaining the lower-layer storage path of the physical entity according to the ID of the physical entity, locating the physical entity according to the lower-layer storage path, and providing the content of the physical entity to the receiveShareUser; and
   searching for all shared subnodes whose parentContentID is the contentID of the shared node when the shared node is a directory, and if" the contentID of a shared subnode is the parentContentID of other nodes, searching for the other nodes, and providing a list of all content under the shared node to the receiveShareUser.

10. The method of claim 5, wherein the providing the shared content to the receiveShareUser according to the contentID of the shared node after the authentication succeeds comprises:
   obtaining the ID of the physical entity related to the shared node according to the contentID of the shared node when the shared node is a file, obtaining the lower-layer storage path of the physical entity according to the ID of the physical entity, locating the physical entity according to the lower-layer storage path, and providing the content of the physical entity to the receiveShareUser; and
   searching for all shared subnodes whose parentContentID is the contentID of the shared node when the shared node is a directory, and if the contentID of a shared subnode is the parentContentID of other nodes, searching for the other nodes, and providing a list of all content under the shared node to the receiveShareUser.

11. A content sharing apparatus, comprising a processor, and further comprising:
   a configuring unit configured to instruct the processor to allocate a contentID unique in a local system for each node in the local system;
   an associating unit configured to instruct the processor to associate the contentID of the node with organization information of the node, wherein the organization information comprises a parentContentID of the node and a contentName of the node;
   a receiving module configured to instruct the processor to receive a shared content access request which carries an identity (ID) of a sendShareUser, an ID of a receiveShareUser, and a contentID of a shared node;
   an authenticating module configured to instruct the processor to authenticate the receiveShareUser when the receiving module receives the shared content access request of the receiveShareUser; and
   a shared content providing module configured to instruct the processor to provide shared content to the receiveShareUser according to the contentID of the shared node.

12. The apparatus of claim 11, wherein, when the node is a file, the organization information further comprises an ID of a physical entity related to the node, wherein the ID of the physical entity corresponds to a lower-layer storage path of the physical entity.

13. The apparatus of claim 11, further comprising:
   a changing unit configured to instruct the processor to change the parentContentID associated with the node to a contentID of a moved parent directory when the node is moved; and
   further configured to instruct the processor to change the contentName associated with the node to a renamed contentName when the node is renamed.

14. The apparatus of claim 11, further comprising:
   a sharing information recording module configured to instruct the processor to record sharing information, wherein the sharing information comprises the contentID of the shared node, the ID of the sendShareUser, and the ID of the receiveShareUser.

15. The apparatus of claim 14, wherein the authenticating module further comprises a comparing unit and a determining unit, wherein:
   the comparing unit is configured to instruct the processor to compare the ID of the sendShareUser, the ID of the receiveShareUser, and the contentID of the shared node carried in the shared content access request with the ID of the sendShareUser, the ID of the receiveShareUser, and the contentID of the shared node in the sharing information respectively, and send a comparison result to the determining unit; and
   the determining unit is configured to instruct the processor to determine whether all compared items are matched according to the comparison result, and if all compared items are matched, determine that the authentication succeeds, and if not all compared items are matched, determine that the authentication fails and obtain an authentication result.

16. The apparatus of claim 11, wherein the shared content providing module comprises:
   a shared file providing unit configured to instruct the processor to obtain the ID of the physical entity related to the shared node according to the contentID of the shared node when the shared node is a file, obtain the lower-layer storage path of the physical entity according to the ID of the physical entity, locate the physical entity according to the lower-layer storage path, and provide the content of the physical entity to the receiveShareUser; and
   a shared directory providing unit configured to instruct the processor to search for all shared subnodes whose parentContentID is the contentID of the shared node when the shared node is a directory, and if the contentID of a shared subnode is the parentContentID of other nodes, search for the other nodes, and provide a list of all content under the shared node to the receiveShareUser.

* * * * *